United States Patent [19]
Ohmae

[11] Patent Number: 5,644,127
[45] Date of Patent: Jul. 1, 1997

[54] ROTARY ENCODER AND INPUT DEVICE USING THE SAME

[75] Inventor: Hideo Ohmae, Kyoto, Japan

[73] Assignee: Rohm Co., Ltd., Kyoto, Japan

[21] Appl. No.: 361,379

[22] Filed: Dec. 22, 1994

[30] Foreign Application Priority Data

Dec. 27, 1993 [JP] Japan ................... 5-348546

[51] Int. Cl.$^6$ .................................................. G01D 5/34
[52] U.S. Cl. ................................. 250/231.16; 345/164
[58] Field of Search .................... 250/231.16, 231.18; 345/163, 164, 167

[56] References Cited

U.S. PATENT DOCUMENTS

| | | | |
|---|---|---|---|
| 3,541,521 | 11/1970 | Koster | 345/164 |
| 4,450,529 | 5/1984 | Hill et al. | |
| 4,496,936 | 1/1985 | Kramer | 250/231.16 |
| 4,538,476 | 9/1985 | Luque | 345/167 |
| 4,839,805 | 6/1989 | Pearson, Jr. et al. | 345/167 |
| 4,974,164 | 11/1990 | Lewis et al. | |
| 5,124,548 | 6/1992 | Igaki | 250/231.16 |
| 5,298,918 | 3/1994 | Yen-Chen et al. | 345/164 |
| 5,345,253 | 9/1994 | Chang | 345/167 |
| 5,414,516 | 5/1995 | Morishita et al. | 250/231.16 |
| 5,432,443 | 7/1995 | Maejima et al. | 250/231.16 |
| 5,436,616 | 7/1995 | Fulatsugi et al. | 345/164 |
| 5,442,313 | 8/1995 | Santos et al. | |

*Primary Examiner*—Stephone Allen
*Attorney, Agent, or Firm*—Fay, Sharpe, Beall, Fagan, Minnich & McKee

[57] ABSTRACT

The present invention includes a light receiving unit having a first and second light receiving element which receive light emitted from a light emitting element via slits formed at a rotary disk and respectively generate detection signals whose phases differ from each other substantially by 90°. A first waveform shaping circuit compares the detection signal from the first light receiving element with a reference value and generates a first detection output of a rectangular waveform. A second waveform shaping circuit compares the detection signal from the second light receiving element with the reference value and generates a second detection output of a rectangular waveform. A peak hold circuit receives the detection signal from the first light receiving element and holds the peak value thereof. A reference value generating circuit generates the reference value depending on the peak value held at the peak hold circuit.

15 Claims, 3 Drawing Sheets

ROTARY ENCODER AND INPUT DEVICE USING THE SAME

BACKGROUND OF THE INVENTION

1. Field of the Invention

The present invention relates to a rotary encoder and, more specifically, relates to a rotary encoder which is built-in such as in a mouse and track ball used for a personal computer, a work station and the like and detects an movement amount or an operation amount (hereinafter referred to as operation amount) in the form of a rotation amount.

2. Description of Background Art

Within the mouse, the track ball and X axis and Y axis sensing mechanisms are usually built-in. The X axis sensing mechanism includes a roller frictionally coupled to the ball and detects movement in the X axis direction and the rotation of the roller is detected by a rotation amount detector such as a rotary encoder. The Y axis sensing mechanism also detects movement in the Y axis direction using a detector based on the rotation of the roller in Y axis direction.

Figure 3:
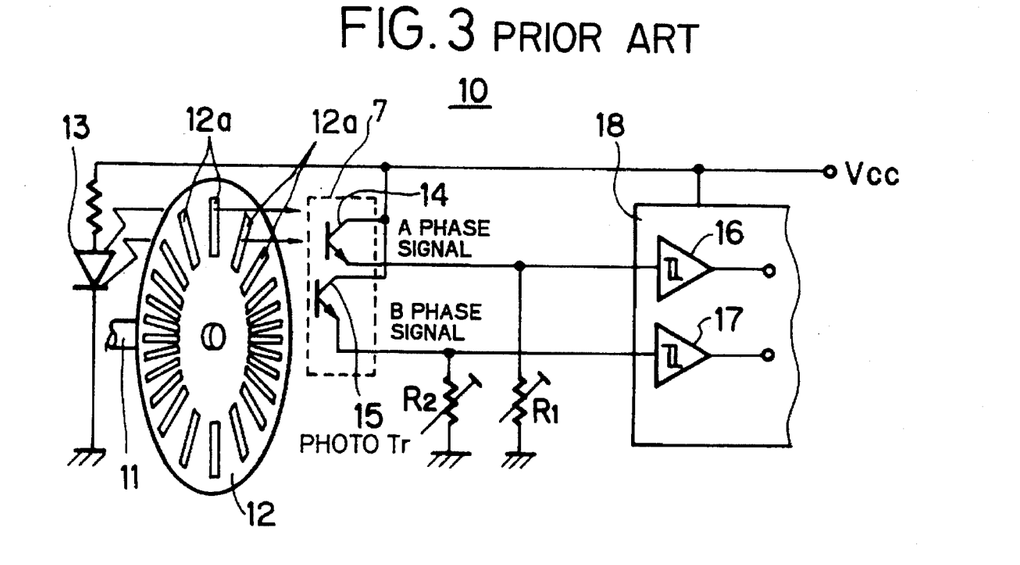
FIG. 3 is a block diagram of a detection circuit in conventional rotary encoders.

FIG. 3 shows a detector portion in a rotary encoder constituting a detector including an X axis or Y axis sensing mechanism.

Numeral 10 is a detector and numeral 11 is a rotary shaft of a roller which is built-in such as in a mouse and a track ball and is frictionally coupled with the ball. 12 is a disk secured to the rotary shaft 11 provided with many radially extending slits 12a and is designed to rotate in association with the rotation of the ball, the movement of which is transmitted via the rotary shaft 11.

13 is a light emission diode and irradiates light receiving elements (photo transistors) 14 and 15 disposed at the opposite side of the disk 12 via the slits 12a. The light receiving elements 14 and 15 are disposed in a single light receiving unit 7 and the positions of the respective light receiving elements 14 and 15 are set in such a manner that when the respective light receiving elements 14 and 15 receive emitted light from the light emission diode 13 via the slits 12a, the respective light receiving elements 14 and 15 generate signals whose phases deviate by about 90° from each other depending on their light receiving positions.

The respective light receiving elements 14 and 15 are constituted by photo transistors, and their collector sides are connected to a power source line Vcc and their emitter sides are connected to the ground via respective variable resistors R1 and R2. Detection signals obtained from the respective light receiving elements 14 and 15 are taken out from the variable resistors R1 and R2 constituting their loads as voltage signals of A phase and B phase and are inputted respectively into comparators 16 and 17 in an encoder 18 provided as a waveform shaping circuit.

When two photo transistors are built-in in the single light receiving unit 7 as explained above, the two photo transistors receive light successively. Therefore the quantity of light irradiated onto the respective photo transistors gradually increases and reaches to maximum according to the rotation of the disk 12 and then begins to decrease. Accordingly, the photo-electrically converted signals at respective photo transistors, namely the detection voltage signals of A phase and B phase (hereinafter simply called as A phase signal and B phase signal) show voltage signals having a substantially sinusoidal waveform other than a rectangular waveform. Therefore, the respective voltage signals are subsequently inputted into the comparators 16 and 17 in the encoder 18 and waveform-shaped into two detection pulses of A phase and B phase (hereinafter simply called as A phase detection pulse and B phase detection pulse). The A phase detection pulse and the B phase detection pulse are respectively inputted into a logic circuit from the comparators 16 and 17 and are sent out to a main body such as a computer after being coded into pulse signals of X direction and Y direction or after being subjected to a conversion into predetermined pulses.

In this instance, sensitivity characteristic variation of the photo transistors caused during manufacturing thereof and light receiving characteristic variation under the assembled condition of the photo diode constituting the light emitting element and the light receiving elements raises problems. In order to absorb these characteristic variations the resistance values of the variable resistors R1 and R2 are adjusted. Instead of the provision of the variable resistors R1 and R2, such a circuit can be provided wherein a plurality of resistors are in advance disposed at the position of the variable resistors and an optimum resistor is selected among the plurality of resistors depending on the circuit condition. In this instance a resistor having the optimum resistance value is selected by cutting off the connecting wirings of other remaining resistors.

Now, the detection pulses respectively formed by waveshaping the A phase signal and B phase signal are counted at the timing of their leading edges or trailing edges and are mostly coded such as into pulse signals. In such an instance, it is preferable that these detection pulses show a phase difference of 90° from each other and are pulses having a duty of 50%. However, in these types of conventional detectors for rotary encoders the amplitudes of A phase and B phase signals prior to the generation of the detection pulses vary depending on variations of the light emitting characteristic of the light emitting diode and of the sensitivity of the photo transistors caused during manufacturing thereof. As a result, the waveforms of the detection pulses after wave shaping vary and the correct phase relationship therebetween is lost. For these reasons it becomes necessary to adjust the levels of the output signals from the respective light receiving elements such as by variable resistors R1 and R2. Therefore, it was difficult to realize a rotary encoder that was free of adjustment as usually required for these types of rotary encoders.

Figure 4:
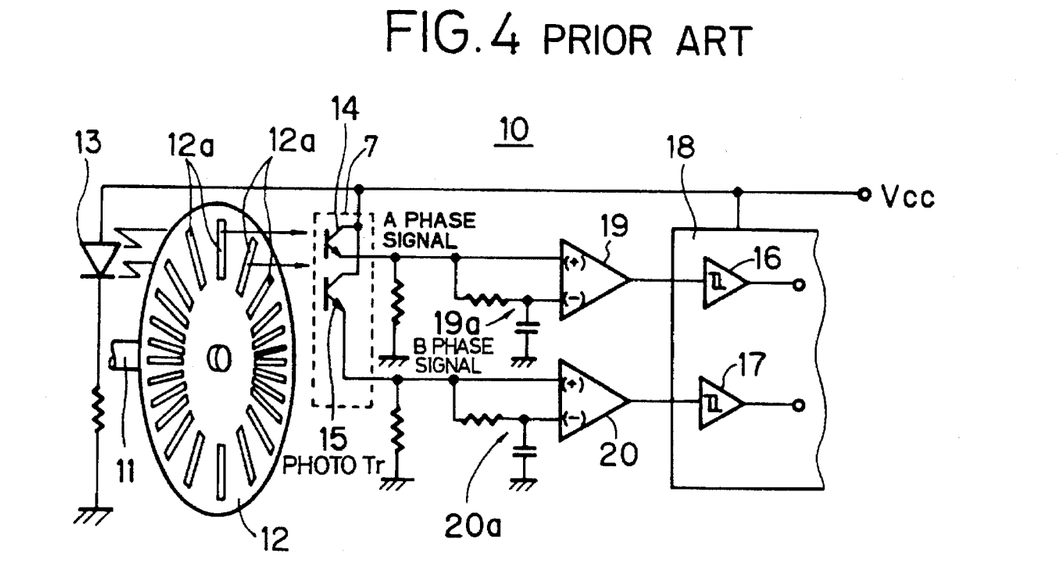
FIG. 4 is a block diagram of another detection circuit in conventional rotary encoders.

FIG. 4 is a circuit which realizes the free of adjustment for these types of the circuits. Between the light receiving elements 14 and 15 and the comparators 16 and 17, comparators 19 and 20 which generate an average value of the output signals from the light receiving elements as a reference level are provided. At − inputs (wherein − phase input in this instance constitutes a reference input side which is also true hereinafter) of the comparators 19 and 20, integration circuits 19a and 20a, each constituted by a resistor and a capacitor and generating the average value, are respectively inserted and with these measures the pulses having a duty of about 50% are obtained. However, the required phase difference of these pulses is affected by the output signal levels of the respective light receiving elements 14 and 15 and is not maintained correctly. Further, these types of circuits require a capacitor having a comparatively large capacitance, therefore it raised problems that it is difficult to form these circuits into an IC and further the circuit size thereof increases.

SUMMARY OF THE INVENTION

An object of the present invention is to provide a rotary encoder which can generate detection pulses having a phase difference of substantially 90° with free of adjustment and is suitable for forming into an IC.

Another object of the present invention is to provide an input device provided with a rotary encoder including a detection circuit which can generate detection pulses having a phase difference of substantially 90° with free of adjustment and is suitable for forming into an IC.

A feature of the rotary encoder and the input device using the same according to the present invention which achieves the above objects includes a light receiving unit including a first and second light receiving element which receive light emitted from a light emitting element via slits formed at a rotary disk and respectively generate detection signals of which phases differ from each other substantially by 90°; a first waveform shaping circuit which compares the detection signal from the first light receiving element with a reference value and generates a first detection output of a rectangular waveform; a second waveform shaping circuit which compares the detection signal from the second light receiving element with the reference value and generates a second detection output of a rectangular waveform; a peak hold circuit which receives the detection signal from the first light receiving element and holds the peak value thereof; and a reference value generating circuit which generates the reference value depending on the peak value held at the peak hold circuit.

In the present invention as explained above, with the provision of the peak hold circuit a comparison reference value is automatically generated with reference to the peak value of one of the detection signals, therefore, even in a case where the detection signals are obtained from a light detection unit incorporating therein two light receiving elements, the reference value operates as the amplitude reference for detection signal from one of the light receiving elements as well as operates as the amplitude reference for the detection signal from the other light receiving element, thereby their respective reference voltage values can be set at their optimum values.

In this instance, even when the amplitudes of the detection signals of the light receiving elements vary due to variations of the characteristic of the light emitting element constituted by a light emitting diode and of the sensitivities of the photo transistors, since the waveforms of the detection signals are nearly sinusoidal forms, with regard to reference levels between top and bottom of the amplitudes of the sinusoidal waveforms no substantial differences are caused for the light receiving elements (such as photo transistors) formed on the same chip. Further, even when dark currents vary upward or downward due to a slight difference of respective offset amounts, no practical problems are raised since the reference level obtained based on the detection signal from one of the light receiving elements is used as the reference level for the other light receiving element, therefore the phase variation of the practical detection pulses is limited to an extent which causes no substantial problems even when the reference level for one of the light receiving elements is used as the reference level for the detection signal of the other light receiving element.

Accordingly, even when there are some amplitude variations on the A phase signal and the B phase signal, substantially correct detection pulses can be obtained without being affected by such variations. In addition, the detection circuit for the rotary encoder does not necessitate such variable resistors and capacitors having a comparatively large capacitance such that the circuit is suitable for forming into an IC and further is constituted as a circuit free of adjustment.

Further, in order to obtain a more accurate detection signal, another peak hold circuit for the other light receiving element can be separately provided for holding the peak value of the detection signal therefrom to generate an individual reference signal.

Still further, for the detection of the peak value when at first both the upper and lower peak values are detected and then correct reference voltages are respectively generated based on the upper and lower peak values, further accurate detection pulses can be generated.

DETAILED DESCRIPTION OF THE PREFERRED EMBODIMENTS

Figure 1:
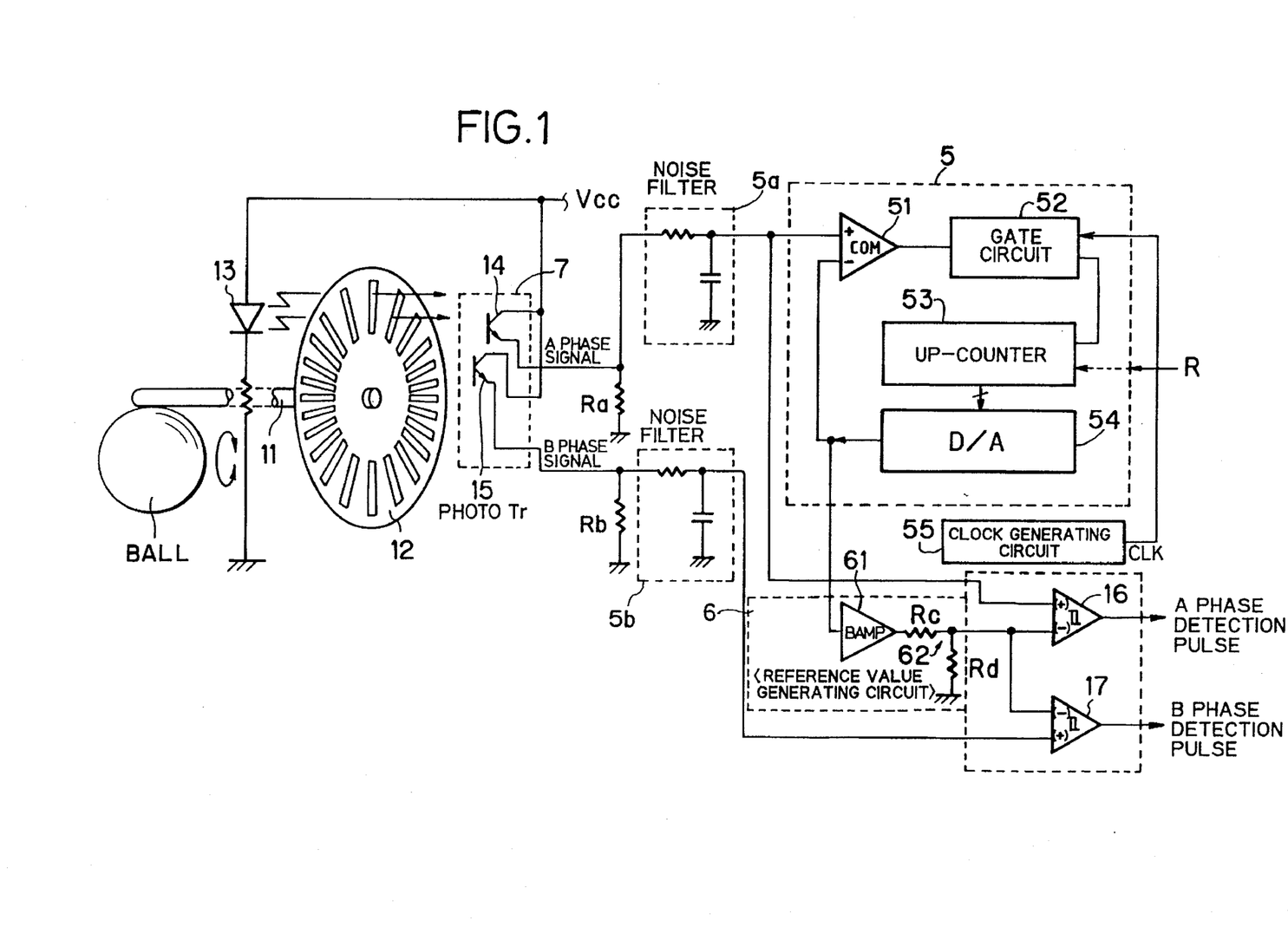
FIG. 1 is a block diagram of a detection circuit and the associating portions therewith of one embodiment to which a rotary encoder according to the present invention is applied.

FIG. 1 circuit is a detector portion in a rotary encoder as X axis and Y axis sensing mechanisms and differs from FIG. 3 circuit in that the variable resistors R1 and R2 are replaced by fixed resistors Ra and Rb, and a peak detection circuit 5 and a reference voltage generating circuit 6 are provided for supplying a reference voltage to the comparators 16 and 17. In FIG. 1, the same constitutional elements as illustrated in FIG. 3 are denoted by the same reference numerals and thus the explanation thereof is omitted.

In FIG. 1, the resistor Ra constitutes a load resistance for the light receiving element 14 at the A phase side and the resistor Rb constitutes a load resistance for the light receiving element 15 at the B phase side. Therefore, the resistance values of these resistors requires no adjustment.

The output of the load resistor Ra at the A phase side is sent out to the peak hold circuit 5 via a noise filter 5a which is designed to remove pulse like noises as well as sent out to + input (which is + phase input terminal and in this instance takes the signal input side, and such is also true hereinafter) of the comparator 16. Further, the output of the load resistor Rb at B phase side is sent out to + input of the comparator 17 via a noise filter 5b.

The peak hold circuit 5 detects a local maximum value and sends out the same to the reference value generating circuit 6. The reference value generating circuit 6 generates a predetermined comparison reference value based on the local maximum voltage value by some means such as a divider resistor and applies the same to the respective − inputs of the comparators 16 and 17 as the reference voltage therefor.

The comparator 16 receives at its − input the reference voltage from the reference value generating circuit 6 and receives at its + input the A phase signal from the load resistor Ra, and, when the A phase signal exceeds the reference voltage, generates an A phase detection pulse.

The comparator 17 also receives at its − input the reference voltage from the reference value generating circuit 6 and receives at its + input the B phase signal from the load resistor Rb, and, when the B phase signal exceeds the reference voltage, generates a B phase detection pulse.

The peak detection circuit 5 and the reference voltage generating circuit 6 generate a voltage signal equal to the amplitude reference of the A phase signal as the reference voltage. When the reference voltage of the reference value generating circuit 6 coincides with the amplitude reference of the A phase signal as well as remains at the vicinity of the amplitude reference of the B phase signal, both the A phase signal and the B phase signal are generated in a phase difference relation of about 90°. Accordingly a phase difference relation of about 90° is substantially maintained between the A phase detection pulse and B phase detection pulse.

Now, when the light receiving elements 14 and 15 are incorporated within a single light receiving unit 7 and formed therein, the photo transistors constituting the light receiving elements 14 and 15 are usually formed on a same semiconductor chip. Although dark currents flow through the respective photo transistors depending on their characteristics and difference of the amplitudes of their detection voltage signals is caused by their receiving sensitivities of the light from the light emitting element 13, no substantial differences of the amplitudes of the respective detection voltage signals with the reference potential are not observed with regard to the light receiving elements 14 and 15 formed on the same semiconductor chip as explained above.

Accordingly, when the reference voltage of the reference value generating circuit 6 is correctly and automatically set so as to coincide with the amplitude reference of either the A phase signal or the B phase signal, the automatically set value mostly coincides with the amplitude reference of the remaining signal even if the amplitude reference of the remaining signal is determined, therefore the yield for manufacturing the circuit is improved. In addition with the above measure, an adjustment free detection circuit is realized.

While taking as the reference voltage one of the amplitude reference of the A phase signal, the peak hold circuit 5 and the reference value generating circuit 6 which generate the reference voltage are explained.

The constitution and operation of the peak hold circuit 5 is at first explained. The peak hold circuit 5 is constituted by a comparator 51, a gate circuit 52, an up counter 53 and a D/A converting circuit (hereinafter simply called as D/A) 54. Upon receipt of a clock pulse CLK from a clock generating circuit 55 arranged in the outside, the gate circuit 52 opens the gate when the output of the comparator 51 is at High level (hereinafter simply indicated as "H") and sends out the clock pulse from the outside to the up counter 53.

The up counter 53 counts the clock pulses CLK received from the gate circuit 52 and sends out the count value to the D/A 54. The D/A 54 converts the received count value into an analog value and applies the same to − input of the comparator 51 as well as sends out the same to the reference value generating circuit 6.

The comparator 51 is designed to compare the present voltage value of the A phase signal from the light receiving element 14 with the voltage value immediately before the present one of the A phase signal, in that the comparator 51 receives the voltage of the A phase signal at its + input and the voltage value from the D/A 54 at its − input and compares the both and when the voltage of the A phase signal exceeds the voltage value from the D/A 54, the comparator 51 continues to send out "H" signal to the gate 52. As a result, the value is A/D converted until the A phase signal reaches a local maximum and the converted signal is applied to the respective − inputs of the comparators 16 and 17. Subsequently, when the A phase signal begings to decrease from the local maximum value, the output of the comparator 51 changes to a Low level (hereinafter simply indicated as "L") and the output is sent out to the gate circuit 52. Thereby, the gate of the gate circuit 52 is closed and the up counter 53 stops the counting operation. As a result, the count value is held at the local maximum value.

At this moment, the reference value generating circuit 6 receives the maximum voltage signal from the D/A 54, of which condition is continuously held. Thus unless there appears no extraordinary condition change in the input signals such as inclusion of a large noise in the input signals, the amplitude of the maximum value of the A phase signal remains unchanged. Further, such noises are removed via the noise filter 5a. Still further, when the peak hold circuit 5 receives a reset signal R from an outside device which is generated, for example, at the time when a power source is switched on, the values at the up counter 53 and the like are cleared to zero and other circuits are also cleared to their initial conditions. Accordingly, the up counter 53 holds the maximum value after the power source is switch on.

The reference value generating circuit 6 is constituted by a buffer amplifier 61 and a resistor dividing circuit 62. The buffer amplifier (BAMP) 61 is a so called voltage follower circuit, and the resistor divider circuit 62 is constituted by resistors Rc and Rd and determines the reference amplitude voltage value of the A phase signal based on the maximum voltage value. In this instance, the voltage division rate by means of the resistors Rc and Rd is in a range of 0.50~0.65 of a maximum voltage value, of which value operates to shift the center value by the corresponding voltage value which is generated depending on the dark current flowing through the light receiving element 14. The reference voltage value based on the amplitude of the A phase signal is usually about 0.6 of the maximum value in view of the corresponding offset component of the minimum current caused by the dark current.

The above explained relationships are likely applied when the A phase signal is replaced by the B phase signal. Further, even when there appears some level variation in the A phase signal, the reference levels of the A phase signal and the B phase signal are substantially kept at a common level in a same semiconductor chip, therefore, the timing relationship of the leading edges and the trailing edges of the detection pulses is kept unchanged.

Figure 2:
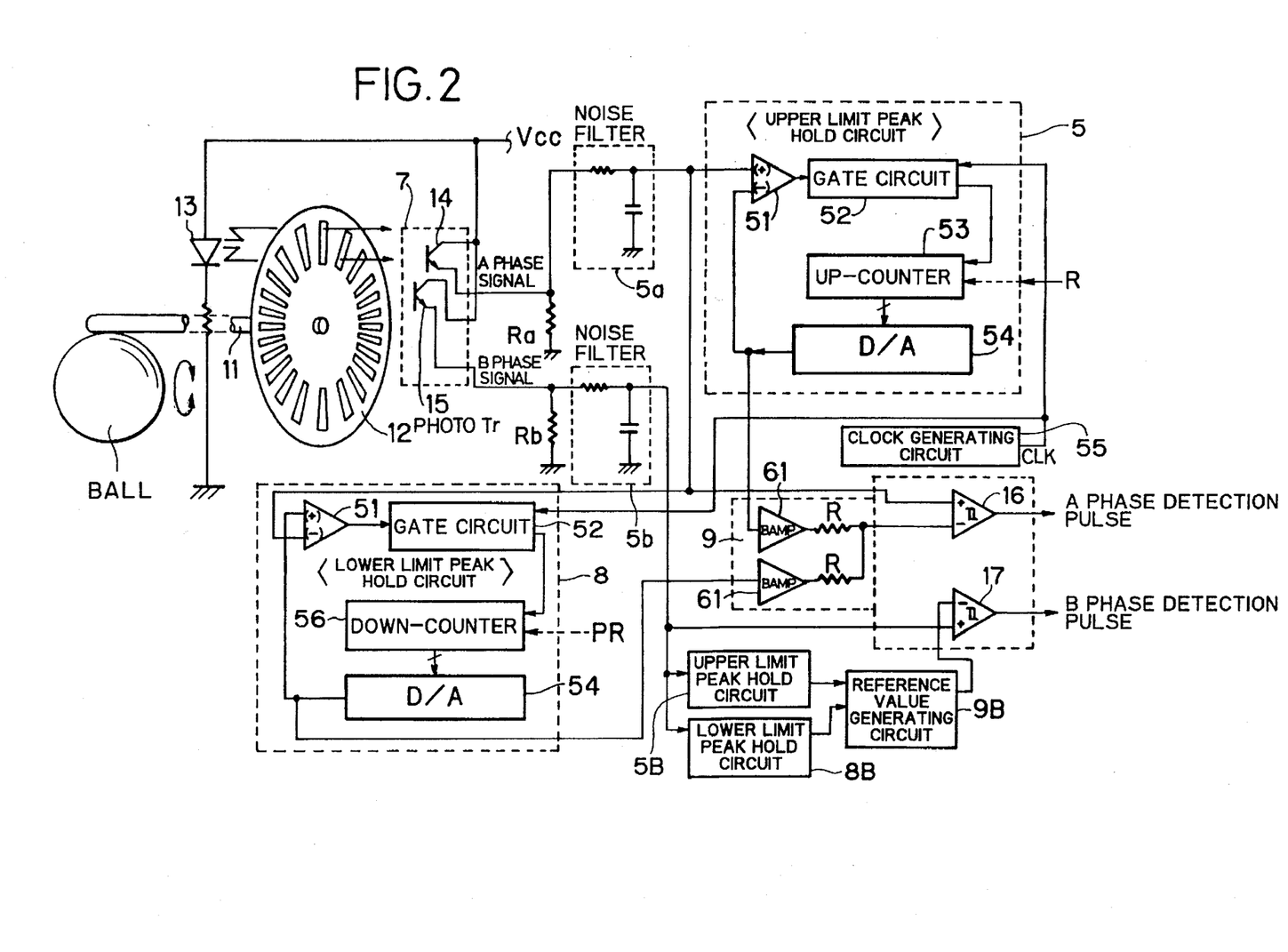
FIG. 2 is a block diagram for explaining another embodiment in which the detection circuit is designed to detect both upper and lower peak values and generates a reference value depending thereon.

Now, in order to manufacture a rotary encoder having a higher accuracy, it is of course preferable to determine respective local maximum values for the A phase signal and the B phase phase signal and further to determine voltages constituting the amplitude reference for the respective signals. FIG. 2 shows an embodiment which fulfills such requirement.

In FIG. 2 circuit, the voltage values constituting the respective amplitude references for the A phase signal and the B phase signal are indpendently generated, wherein the maximum and minimum values of the respective voltage signals are obtained and their amplitude references are set at their center values.

For this reason the peak hold circuit 5 in FIG. 1 which detects the maximum is used here as an upper limit peak hold circuit and further a peak hold circuit 8 is added which detects the minimum value and is used as a lower limit peak hold circuit. Further, 5B is an upper peak hold circuit at the B phase signal side corresponding to the upper limit peak hold circuit 5 at the A phase signal side and its internal structure is identical as that of the peak hold circuit 5. Further, 8B is a lower peak hold circuit at the B phase signal side corresponding to the lower limit peak hold circuit 8 at the A phase signal side and its internal structure is identical as that of the peak hold circuit 8. Still further, the reference value generating circuit 9 is a reference voltage generating circuit for the A phase signal side, 9B is a reference voltage generating circuit for the B phase signal side and its internal structure is also identical as that of the reference value generating circuit 9. Accordingly, hereinafter the peak hold circuits 5 and 8 and the reference value generating circuit 9 are specifically explained and the explanation of the peak hold circuits 5B and 8B and the reference value generating circuit 9B are omitted except for as otherwise required.

The reference value generating circuit 9 is a circuit which is designed to generate a center value of the respective voltages of the peak hold circuit 5 and the peak hold circuit 8 and is constituted by buffer amplifiers 61, 61 and a voltage divider circuit constituted by resistors R, R having the same resistance values for dividing the output voltages from these buffer amplifiers.

The peak hold circuit 8 is constituted substantially the same as the peak hold circuit 5, however the differences thereof with the peak hold circuit 5 are in the fact that the peak hold circuit 8 includes a down counter 56 in place of the up counter 53 in the peak hold circuit 5, the relationship of the input signals to the respective comparator 51 are inverted, and further in place of the reset signal R, a preset signal PR is inputted to the down counter 56.

The down counter 56 is preset at its initial value by the preset signal PR which is generated in correspondance with the reset signal R, opens the gate circuit 52 when the input signal drops below its initial value and performs down counting of the clock pulses CLK therethrough. Further, the analogue value from the D/A 54 is applied to + input of the comparator 51 and the A phase signal is applied to − input thereof via the noise filter 5a.

The down counter 56 counts the clock pulses CLK when the voltage level of the present detection signal is lower than the voltage level of the detection signal immediately before the present detection signal and terminates the counting when the voltage level of the present detection signal becomes equal to or higher than the voltage level of the detection signal immediately before the present detection signal depending on the comparison result of the comparator 51.

As a result, contrary to the up counter 53 the down counter 56 holds the minimum value. Further, the operation of the gate circuit 52 and the D/A 54 is identical as in the case of the peak hold circuit 5. Still further, it is satisfactory if the preset value of the down counter 56 is selected at the reference value corresponding to the amplitude of the A phase signal or a value at the vicinity thereof.

As indicated above, the constitutions as explained above are likely provided for the B phase signal side and in the B phase signal side the reference voltage for the comparator 17 is also generated independently by the upper limit peak hold circuit 5B, the lower limit peak hold circuit 8B and the reference value generating circuit 9B.

Further, in FIG. 2 embodiment the peak hold circuits which are designed to detect the upper limit values and the lower limit values respectively are, in particular provided for the A phase signal side and the B phase signal side, the noise filters 5a and 5b are not necessarily needed.

An explanation on the general operation of the upper limit and lower limit peak hold circuits and the reference value generating circuit is omitted because such has been explained in connection with FIG. 1.

As explained hereinabove, in FIG. 2 embodiment through the provision of the respective upper limit peak hold circuits and lower limit peak hold circuits for the A phase signal and the B phase signal the reference voltages are generated, however it is of course possible to eliminate the lower limit peak hold circuit in the same manner as in FIG. 1 embodiment and to generate respective reference voltages for the A phase signal and for the B phase signal only by means of the upper limit side peak hold circuits. Further, it is also possible to provide both the upper limit peak hold circuit and the lower limit peak hold circuit for one of the A phase signal side and the B phase signal side as in the same manner in FIG. 1 embodiment and therewith to generate a reference voltage both for the A phase signal side and for the B phase signal side.

Still further, in the respective embodiments when the reset signal R and the preset signal PR are generated periodically the noise filters 5a and 5b are almost unneeded because variation of the detected peak values due to noises is reduced. Moreover, the detection signals at the A phase side and at the B phase side generated from the respective light receiving elements need not be in a complete sinusoidal form but are acceptable if they are nearly in a sinusoidal form.

I claim:

1. A rotary encoder comprising:

a light receiving unit including a first light receiving element and a second light receiving element which receive light emitted from a light emitting element via slits formed at a rotary disk and respectively generate detection signals whose phases differ from each other substantially by 90°;

a first waveform shaping circuit which compares the detection signal from said first light receiving element with a reference value and generates a first detection output of a rectangular waveform;

a second waveform shaping circuit which compares the detection signal from said second light receiving element with the reference value and generates a second detection output of a rectangular waveform;

a peak hold circuit which receives the detection signal from said first light receiving element and holds the peak value thereof; and a reference value generating circuit which generates the reference value depending on the peak value held at said peak hold circuit.

2. A rotary encoder according to claim 1, wherein the detection signals are substantially a sinusoidal waveform, and said peak hold circuit includes a comparator which compares the voltage value of the present detection signal outputted from said first light receiving element with the voltage value of the detection signal immediately before the present detection signal, a counter which counts inputted clock pulses when the voltage level of the present detection signal is higher than the voltage level of the detection signal immediately before the present detection signal and terminates the counting when the voltage level of the present detection signal becomes equal to or lower than the voltage level of the detection signal immediately before the present detection signal depending on the comparison result of said comparator and a D/A converting circuit which converts the value from said counter to an analog value and outputs the same to said comparator as the voltage value of the detection signal immediately before the present detection signal which is sent out to said reference value generating circuit as the peak value held in said peak hold circuit.

3. A rotary encoder according to claim 2, further comprising a clock generating circuit which generates said clock pulses and wherein said peak hold circuit further includes a gate circuit which receives said clock pulses and the output from said comparator, passes said clock pulses depending on the output thereof and applies the same to said counter.

4. A rotary encoder according to claim 3 further comprising, a filter circuit for removing noises disposed between said first light receiving element and said peak hold circuit, and wherein said counter is reset at the moment when a power source is switched on.

5. A rotary encoder according to claim 4, wherein said reference value generating circuit generates the reference value by voltage-dividing the held peak value with a voltage dividing rate which is shifted by the corresponding voltage value caused by a dark current flowing through said first light receiving element.

6. A rotary encoder according to claim 1, wherein said peak hold circuit is a first peak hold circuit and further comprising, a second peak hold circuit which receives the detection signal from said second light receiving element and holds the peak value thereof as a second peak value;

said first peak hold circuit includes a first comparator which compares the voltage value of the present detection signal outputted from said first light receiving element with the voltage value of the detection signal immediately before the present detection signal, a first counter which up-counts inputted clock pulses when the voltage level of the present detection signal is higher than the voltage level of the detection signal immediately before the present detection signal and terminates the counting when the voltage level of the present detection signal becomes equal to or lower than the voltage level of the detection signal immediately before the present detection signal depending on the comparison result of said first comparator and a first D/A converting circuit which converts the value from said first counter to an analog value and outputs the same to said first comparator as the voltage value of the detection signal which is sent out to said reference value generating circuit as the first peak value held in said first peak hold circuit, and said second peak hold circuit includes a second comparator which compares the voltage value of the present detection signal outputted from said second light receiving element with the voltage value of the detection signal immediately before the present detection signal, a second counter which down-counts inputted clock pulses when the voltage level of the present detection signal is lower than the voltage level of the detection signal immediately before the present detection signal and terminates the counting when the voltage level of the present detection signal becomes equal to or higher than the voltage level of the detection signal immediately before the present detection signal depending on the comparison result of said second comparator and a second D/A converting circuit which converts the value from said second counter to an analog value and outputs the same to said second comparator as the voltage value of the detection signal immediately before the present detection signal which is sent out to said reference value generating circuit as the second peak value held in said second peak hold circuit.

7. A rotary encoder comprising:

a light receiving unit including a first light receiving element and a second light receiving element which receive light emitted from a light emitting element via slits formed at a rotary disk and respectively generate detection signals whose phases differ from each other substantially by 90°;

a first waveform shaping circuit which compares the detection signal from said first light receiving element with a first reference value and generates a first detection output of a rectangular waveform;

a second waveform shaping circuit which compares the detection signal from said second light receiving element with a second reference value and generates a second detection output of a rectangular waveform;

a first peak hold circuit which receives the detection signal from said first light receiving element and holds the peak value thereof as a first peak value;

a first reference value generating circuit which generates the first reference value depending on the first peak value held at said first peak hold circuit;

a second peak hold circuit which receives the detection signal from said second light receiving element and holds the peak value thereof as a second peak value; and a second reference value generating circuit which generates the second reference value depending on the second peak value held at said second peak hold circuit.

8. A rotary encoder according to claim 7, wherein said first peak hold circuit includes a first comparator which compares the voltage value of the present detection signal outputted from said first light receiving element with the voltage value of the detection signal immediately before the present detection signal, a first counter which counts inputted clock pulses when the voltage level of the present detection signal is higher than the voltage level of the detection signal immediately before the present detection signal and terminates the counting when the voltage level of the present detection signal becomes equal to or lower than the voltage level of the detection signal immediately before the present detection signal depending on the comparison result of said first comparator and a first D/A converting circuit which converts the value from said first counter to an analog value and outputs the same to said first comparator as the voltage value of the detection signal immediately before the present detection signal which is sent out to said first reference value generating circuit as the first peak value held in said first peak hold circuit, and said second peak hold circuit includes a second comparator which compares the voltage value of the present detection signal outputted from said second light receiving element with the voltage value of the detection signal immediately before the present detection signal, a second counter which counts inputted clock pulses when the voltage level of the present detection signal is higher than the voltage level of the detection signal immediately before the present detection signal and terminates the counting when the voltage level of the present detection signal becomes equal to or lower than the voltage level of the detection signal immediately before the present detection signal depending on the comparison result of said second comparator and a second D/A converting circuit which converts the value from said second counter to an analog value and outputs the same to said second comparator as the voltage value of the detection signal immediately before the present detection signal which is sent out to said second reference value generating circuit as the second peak value held in said second peak hold circuit.

9. An input device comprising: first and second rotary encoders each comprising, a light receiving unit including a first and second light receiving element which receive light emitted from a light emitting element via slits formed at a rotary disk and respectively generate detection signals whose phases differ from each other substantially by 90°; a first waveform shaping circuit which compares the detection signal from said first light receiving element with a reference value and generates a first detection output of a rectangular waveform; a second waveform shaping circuit which compares the detection signal from said second light receiving element with the reference value and generates a second detection output of a rectangular waveform; a peak hold circuit which receives the detection signal from said first light receiving element and holds the peak value thereof; and a reference value generating circuit which generates the reference value depending on the peak value held at said peak hold circuit;

a first disk rotating mechanism which is disposed for X direction in a XY coordinate system and causes said rotary disk to rotate in said first rotary encoder;

a second disk rotating mechanism which is disposed for Y direction in the XY coordinate system and causes said rotary disk to rotate in said second rotary encoder; and a ball which is coupled to said first and second disk rotating mechanisms and causes said first and second rotary encoders to rotate.

10. An input device according to claim 9, wherein the detection signals are substantially a sinusoidal waveform, and said peak hold circuit includes a comparator which compares the voltage value of a present detection signal outputted from said first light receiving element with the voltage value of a detection signal immediately before the present detection signal, a counter which counts inputted clock pulses when the voltage level of the present detection signal is higher than the voltage level of the detection signal immediately before the present detection signal and terminates the counting when the voltage level of the present detection signal becomes equal to or lower than the voltage level of the detection signal immediately before the present detection signal depending on the comparison result of said comparator and a D/A converting circuit which converts the value from said counter to an analog value and outputs the same to said comparator as the voltage value of the detection signal immediately before the present detection signal which is sent out to said reference value generating circuit as the peak value held in said peak hold circuit.

11. An input device according to claim 10, further comprising a clock generating circuit which generates said clock pulses and wherein said peak hold circuit further includes a gate circuit which receives said clock pulses and the output from said comparator, passes said clock pulses depending on the output thereof and applies the same to said counter.

12. An input device according to claim 11, further comprising a filter circuit for removing noises disposed between said first light receiving element and said peak hold circuit, and wherein said counter is reset at the moment when a power source is switched on.

13. An input device according to claim 12, wherein said reference value generating circuit generates the reference value by voltage-dividing the held peak value with a voltage dividing rate which is shifted by the corresponding voltage value caused by a dark current flowing through said first light receiving element.

14. An input device according to claim 9, wherein said peak hold circuit is a first peak hold circuit and further comprising, a second peak hold circuit which receives the detection signal from said second light receiving element and holds the peak value thereof as a second peak value;

said first peak hold circuit includes a first comparator which compares the voltage value of the present detection signal outputted from said first light receiving element with the voltage value of the detection signal immediately before the present detection signal, a first counter which up-counts inputted clock pulses when the voltage level of the present detection signal is higher than the voltage level of the detection signal immediately before the present detection signal and terminates the counting when the voltage level of the present detection signal becomes equal to or lower than the voltage level of the detection signal immediately before the present detection signal depending on the comparison result of said first comparator and a first D/A converting circuit which converts the value from said first counter to an analog value and outputs the same to said first comparator as the voltage value of the detection signal which is sent out to said reference value generating circuit as the first peak value held in said first peak hold circuit, and said second peak hold circuit includes a second comparator which compares the voltage value of the present detection signal outputted from said second light receiving element with the voltage value of the detection signal immediately before the present detection signal, a second counter which down-counts inputted clock pulses when the voltage level of the present detection signal is lower than the voltage level of the detection signal immediately before the present detection signal and terminates the counting when the voltage level of the present detection signal becomes equal to or higher than the voltage level of the detection signal immediately before the present detection signal depending on the comparison result of said second comparator and a second D/A converting circuit which converts the value from said second counter to an analog value and outputs the same to said second comparator as the voltage value of the detection signal immediately before the present detection signal which is sent out to said reference value generating circuit as the second peak value held in said second peak hold circuit.

15. An input device according to claim 13, wherein said peak hold circuit is a first peak hold circuit and further comprising, a second peak hold circuit which receives the detection signal from said second light receiving element and holds the peak value thereof as a second peak value;

said first peak hold circuit includes a first comparator which compares the voltage value of the present detection signal outputted from said first light receiving element with the voltage value of the detection signal immediately before the present detection signal, a first counter which up-counts inputted clock pulses when the voltage level of the present detection signal is higher than the voltage level of the detection signal immediately before the present detection signal and terminates the counting when the voltage level of the present detection signal becomes equal to or lower than the voltage level of the detection signal immediately before the present detection signal depending on the comparison result of said first comparator and a first D/A converting circuit which converts the value from said first counter to an analog value and outputs the same to said first comparator as the voltage value of the detection signal which is sent out to said reference value generating circuit as the first peak value held in said first peak hold circuit, and said second peak hold circuit includes a second comparator which compares the voltage value of the present detection signal outputted from said second light receiving element with the voltage value of the detection signal immediately before the present detection signal, a second counter which down-counts inputted clock pulses when the voltage level of the present detection signal is lower than the voltage level of the detection signal immediately before the present detection signal and terminates the counting when the voltage level of the present detection signal becomes equal to or higher than the voltage level of the detection signal immediately before the present detection signal depending on the comparison result of said second comparator and a second D/A converting circuit which converts the value from said second counter to an analog value and outputs the same to said second comparator as the voltage value of the detection signal immediately before the present detection signal which is sent out to said reference value generating circuit as the second peak value held in said second peak hold circuit.

\* \* \* \* \*